W. H. McINTOSH.

Improvement in the Manufacture of Blind-Hinge Hooks.

No. 126,150. Patented April 30, 1872.

Witnesses:
James Nickelson,
Reuben Kahert.

Inventor:
Wm. H. McIntosh

UNITED STATES PATENT OFFICE.

WILLIAM H. McINTOSH, OF NEEDHAM UPPER FALLS, MASSACHUSETTS.

IMPROVEMENT IN THE MANUFACTURE OF BLIND-HINGE HOOKS.

Specification forming part of Letters Patent No. 126,150, dated April 30, 1872.

SPECIFICATION.

*To all whom it may concern:*

Be it known that I, WM. H. McINTOSH, of Needham Upper Falls, in the county of Norfolk, in the State of Massachusetts, have invented a new and Improved Mode of Making Solid-Shoulder Blind-Hinge Hooks; and I do hereby declare that the following is a full and exact description thereof, reference being had to the accompanying drawing and to the letters of reference marked thereon making a part of this specification.

The nature of my invention consists in the preparatory mode of cutting the iron which is to be formed into a hook by cutting out the blank forms, so as to have those portions which are to be formed into the brace and spindle upon opposite sides of the shank by cutting the head or shoulder of the hook alternately from each side of the plate, leaving the plate prepared for the next cutting with little or no loss of stock.

To enable others skilled in the art to make and use my invention, I will proceed to describe its construction.

Figure 1:
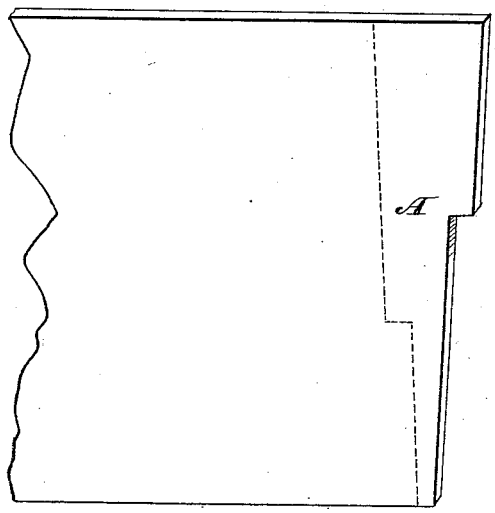
Figure 2:
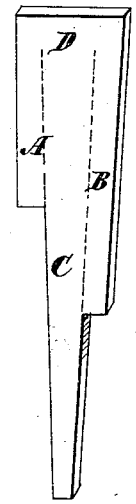
Figure 3:
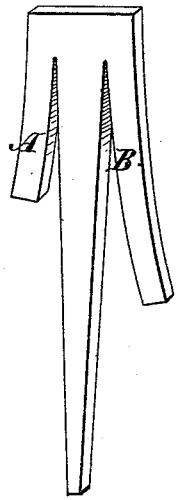
Figure 4:
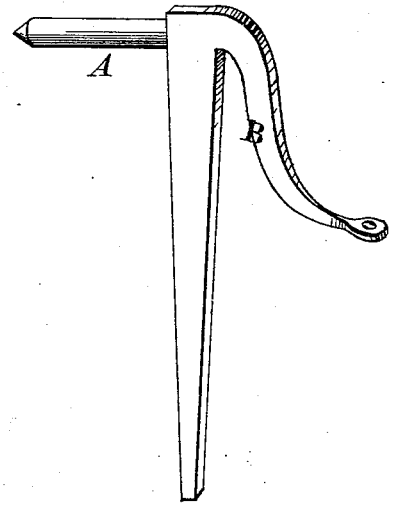

I take any good iron of the proper width and thickness, according to the size of hook required, and cut the piece which I intend to make into a hook from the iron in the manner shown at A, Fig. 1. I then separate the parts A and B, Fig. 2, from the shank C as far as the shoulder D, in the manner shown in Fig. 3. The short arm A and the long arm B, Fig. 3, I then forge into shape, making, respectively, the brace A and spindle B, as shown in Fig. 4, the whole forming the hook, substantially as set forth.

What I claim as my invention, and desire to secure by Letters Patent, is—

The mode of cutting the blank which is to be formed into a hook, having the stock from which the brace and spindle is formed upon the sides of the shank, in the manner set forth and described.

WM. H. McINTOSH.

Witnesses:
   JAMES NICKELSON,
   REUBEN KAHERL.